United States Patent [19]

Shiono et al.

[11] Patent Number: 4,870,632
[45] Date of Patent: Sep. 26, 1989

[54] OPTICAL HEAD WITH ASTIGMATIC REFLECTING ELEMENT

[75] Inventors: Teruhiro Shiono, Osaka; Kentaro Setsune, Sakai; Osamu Yamazaki, Toyonaka, all of Japan

[73] Assignee: Matsushita Electric Industrial Co., Ltd., Kadoma, Japan

[21] Appl. No.: 169,478

[22] Filed: Mar. 17, 1988

[30] Foreign Application Priority Data

Mar. 17, 1987 [JP] Japan .................................. 62-61562
May 12, 1987 [JP] Japan ................................. 62-115019

[51] Int. Cl.$^4$ .............................................. G11B 7/00
[52] U.S. Cl. ......................................... 369/44; 369/45; 369/46; 250/201
[58] Field of Search .................... 358/342; 369/43–47; 250/201 DF

[56] References Cited

U.S. PATENT DOCUMENTS 4,441,175 4/1984 Shuman ................................ 369/45

OTHER PUBLICATIONS

Hatakoshi et al, "Astigmatic Grating Lens", Extended Abstracts (The Autumn Meeting, 1983); The Japan Society of Applied Physics 26P-S-5.
Hatakoshi et al: "Manufacturing of and Experiment on Focus Detection Grating Lens", Extended Abstracts (The Spring Meeting, 1984); The Japan Society of Applied Physics 30a-K-1.
Okazaki: "Optical Pick-up with Reduced number of Components"; O plus E, 3/1986.

Primary Examiner—Robert L. Richardson
Attorney, Agent, or Firm—Cushman, Darby & Cushman

[57] ABSTRACT

An optical head for reproducing optical recording medium (6) has reflection optical means, such as, a reflection type astigmatic optical Fresnel lens (7A, 7B) or reflection type light-beam dividing (into at least two beams) Fresnel lens (13), grating (18) or prism (19), on or above a surface of a beam splitter (4), so that reflect return light from the optical recording medium (6) travels in the beam splitter 4 to photo-detector means (8, 15) having at least two divided parts (8A, 8B, 8C, 8D or 15A, 15B, 15C, 15D); thereby size of the optical head is reduced by setting the optical path from the reflection optical means to the photo-detector inside the beam splitter (4).

32 Claims, 22 Drawing Sheets

F I G. 12
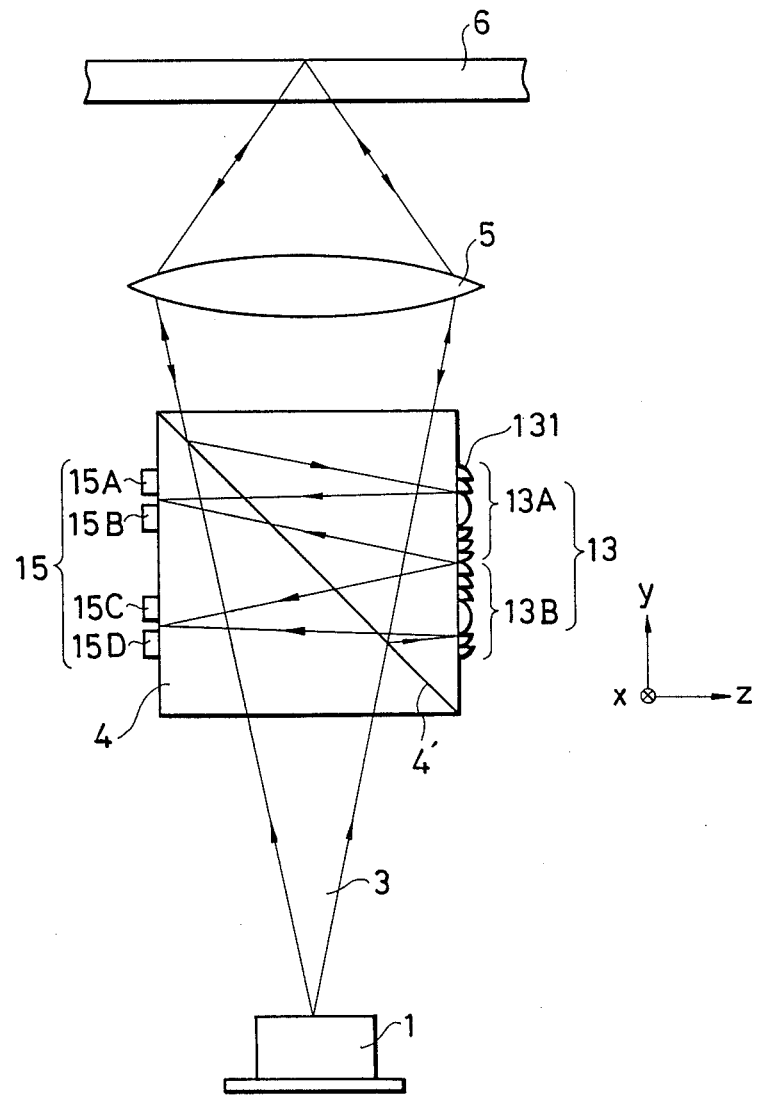

F I G. 21
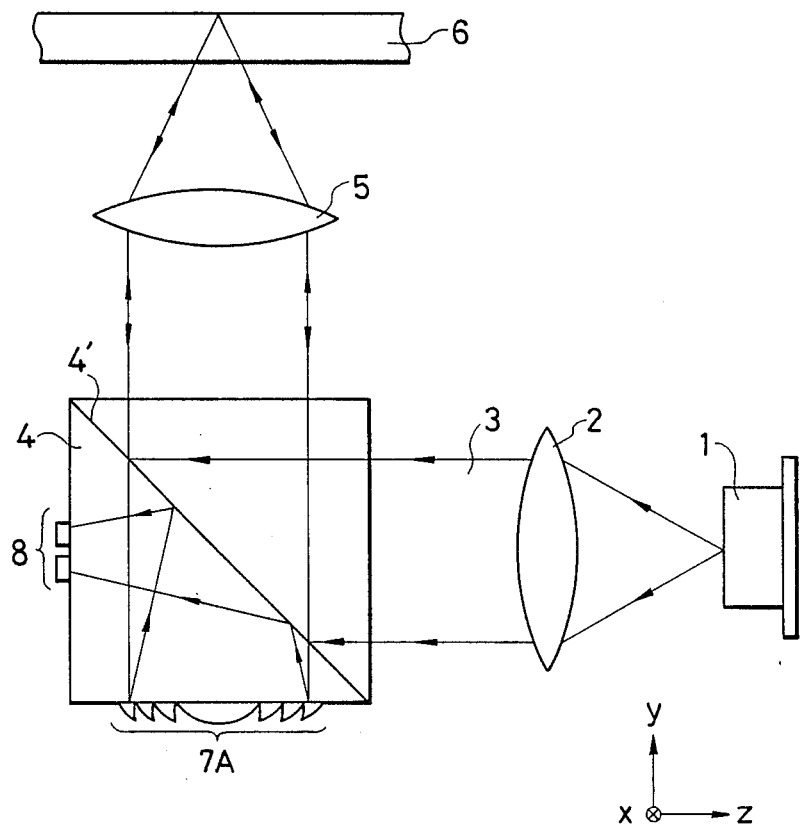

OPTICAL HEAD WITH ASTIGMATIC REFLECTING ELEMENT

FIELD OF THE INVENTION AND RELATED ART STATEMENT

1. Field of the Invention:

The present invention relates to an optical head for use in an optical recording apparatus such as optical disk, compact disk, optical card memory, etc. and especially relates to an optical head of very small type.

2. Description of the Related Art

An optical head is an important device for reading optical disk, compact disk, optical card memory, or the like optical recording mediums which have recently enjoyed wide use. The optical head is required to provide functions of not only signal detection, but also of focus servo controlling or track servo controlling.

In a conventional detection system for focus error signal, an astigmatic method, Foucault method, etc., may be used. A detection system for tracking error signal may use a heterodyne method, a push-pull method, a 3-beam method, etc. Prior art astigmatic methods, which use a transmission ellipticalal Fresnel lens are reported in (Hatakoshi, et al.: "Astigmatic Grating Lens", Extended Abstracts (The Autumn Meeting, 1983), The Japan Society of Applied Physics 26p-S-5; Hatakoshi, et al.: "Manufacturing of and Experiment on Focus Detection Grating Lens", Extended Abstracts (The Spring Meeting, 1984), The Japan Society of Applied Physics and Related Societies 30a-K-1). FIG. 1 shows the conventional optical head using the astigmatic method. As shown in FIG. 1, laser light 3 emitted from a semiconductor laser 1 is collimated by a collimation lens 2, and then passes through a beam splitter 4, and then is converged on an optical disk or the like optical medium by an objective lens 5. Light reflected by pits on the optical disk 6 is collimated by the objective lens 5, and divided by the beam splitter 4, and then is transmitted to elliptical Fresnel lens 9, and finally converged on a four-divided photodetector 10. And, by processing signals issued from the optical detector 10 of four-divided type, the RF read-out signal and focus error signal are picked up, and tracking error signal is read out by known heterodyne method or the like.

One example of the conventional optical head using the Foucault method is shown in FIG. 2. (Okazaki: "Optical Pick-up with Reduced number of Components", O plus E, March 1986) In FIG. 2, a laser beam 3 emitted from a semiconductor laster 1 passes through a beam splitter 4 and is converged on an optical disk 6 by objective lens 5. Light reflected by pits on the optical disk 6 passes through the objective lens 5 and is reflected by the beam splitter 4 to the right of FIG. 2, and is introduced to a pair of transmission prisms 16A, 16B, whereby the reflected light beam converges in a two-divided manner on an optical detector 14. From the electric signals issued from the optical detector 14, reproduced signal and focus error signal are read out, and furthermore, tracking error signal is read out by the push-pull method or the like.

In the conventional optical head shown in FIG. 1, because the transmission elliptical Fresnel lens 9 is utilized as the optical element having the astigmatic characteristic, the geometric size of the system can be decreased in comparison with the commonly used conventional combination of convex lens or concave lens with cylindrical lens, but the optical system of FIG. 1 still requires a considerable distance between the elliptical Fresnel lens 9 and the optical detector 10. Since the distance depends on numerical aperture NA of the lens 9 or focal length thereof, it is difficult in manufacturing to make the NA large when using a diffraction lens, such as the Fresnel lens; and the practically obtainable NA is at most 0.5. Furthermore, when NA is made large in order to decrease the geometric size, the requirements of optical alignment become very strict, and limits the minimization of the optical head. On the other hand, in the conventional optical head shown in FIG. 2, a considerable distance is required between the transmission prisms 16A, 16B and the optical detector 14, since light reflected from the optical disk 6 is refracted by transmission prisms 16A, 16B divided into two beams in order to make error detection, and this distance also limits to minimization of the system.

OBJECT AND SUMMARY OF THE INVENTION

The present invention provides a small an optical head. In order to resolve the above-mentioned problem, the optical head in accordance with the present invention comprises a reflection means with astigmatic characteristics or reflection means which divides reflection beam into at least two parts, in a path of reflected light beam from optical recording medium.

That is, the optical head in accordance with the present invention comprises:

a light source for emitting a light beam, a beam splitter for splitting the laser light beam incident to its light incident face into at least two light beams, one in straight direction and the other in a different direction, an objective lens for focusing a light splitted by the beam splitter to make a focused spot and project it on an optical recording means, to make a return light reflected from the optical recording means, photo-detector means comprising plural photo-detection elements provided on or above a face of the beam splitter, and reflection optical means which is provided on or above a return light output face which is other than a return light output face to which the light source is opposing, with respect to the return light from the optical recording means, the reflection optical means reflecting light beam incident thereto in plural different manners, first manner being that when the focused spot is made nearer than the recording face of the recording medium its reflected light beam makes a first image to make the photo-detector issue a first signal, when the focused spot is made farther than the recording face its reflected light beam makes a second image to make the photo-detector issue a second signal, and when the focused spot is made accurately on the recording face its reflected light beam makes a third image to make the photo-detector issue a third signal.

BRIEF DESCRIPTION OF THE DRAWING

FIG. 3 through FIG. 5 show a first preferred embodiment of the present invention, wherein:

FIG. 3 is a sectional view of a configuration of the first embodiment.

FIG. 12 through FIG. 15 show an optical head of a seventh preferred embodiment of the present invention.

FIG. 12 is a sectional view of a configuration of the seventh embodiment.

FIG. 13(a) is a plan view of reflection cylindrical Fresnel lens of the optical head of the seventh preferred embodiment of the present invention.

FIG. 13(b) is a rear view showing disposition of optical detector of the seventh embodiment.

FIG. 14(a) is a sectional view showing laser light path in an optical head using rectangle shape beam splitter.

FIG. 14(b) is a sectional view showing laser light path in an optical head using non-rectangle shape beam splitter.

FIG. 21 is a sectional view of a thirteenth embodiment.

DESCRIPTION OF THE PREFERRED EMBODIMENT

Figure 1:
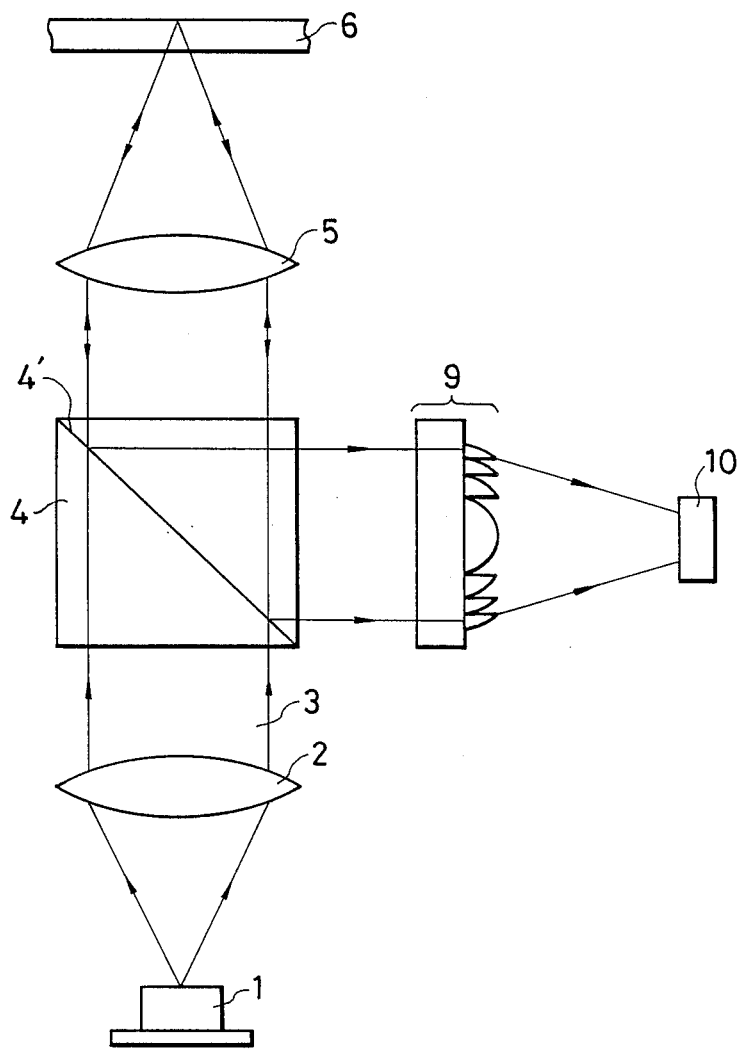
FIG. 1 is the sectional view of a configuration of the conventional optical head using the astigmatic error method.
Figure 2:
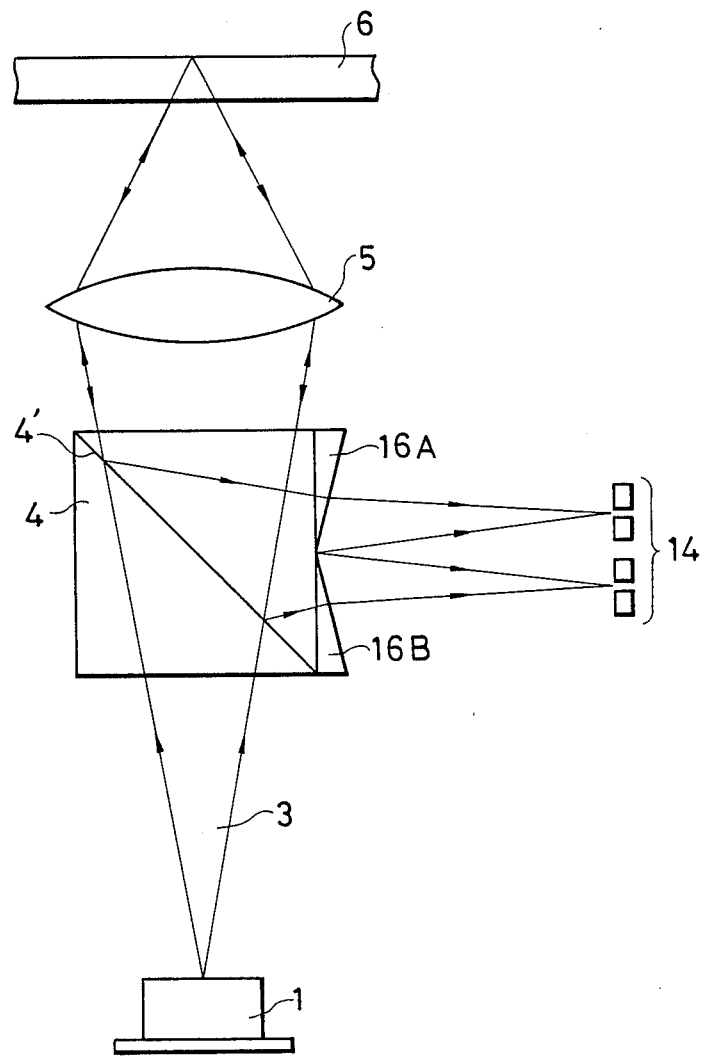
FIG. 2 is the sectional view of a configuration of the conventional optical head using the Foucault method.
Figure 3:
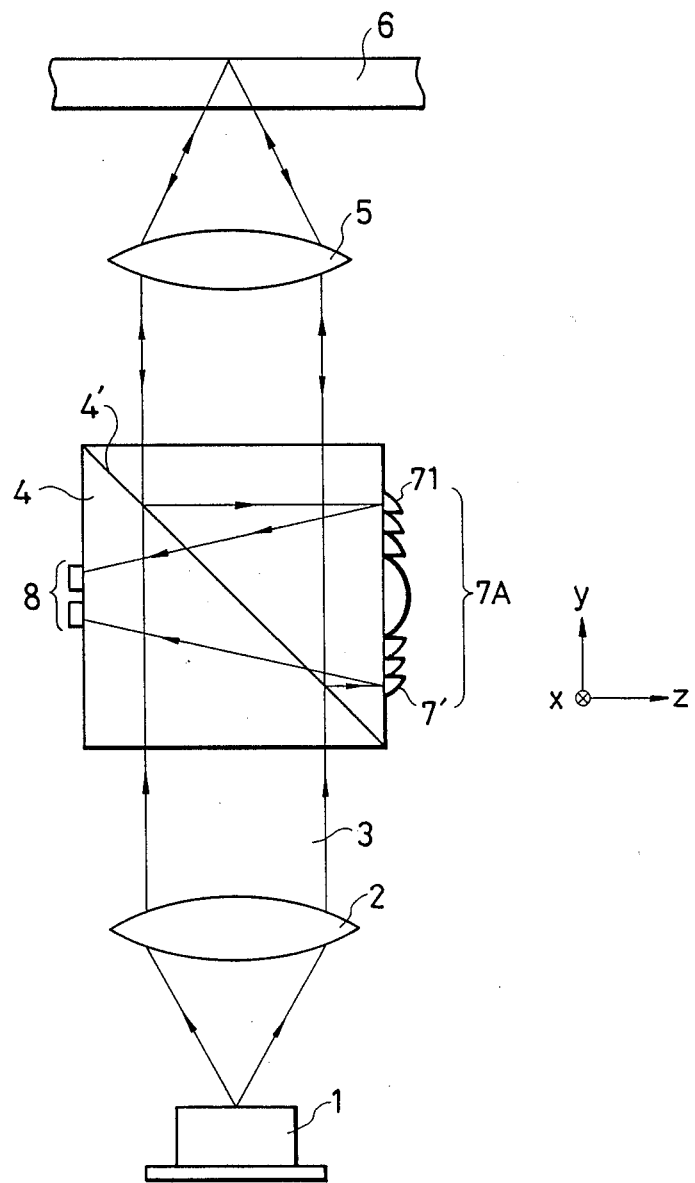
Figure 4A:
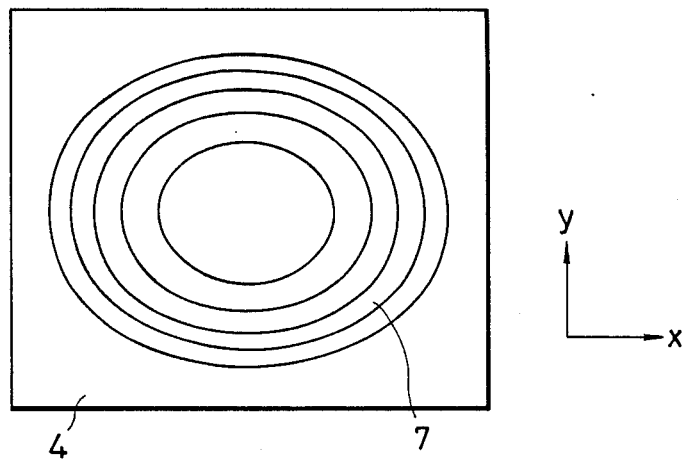
FIG. 4(a) is a plan view of reflection elliptical Fresnel lens of the optical head of the first preferred embodiment of the present invention.
Figure 4B:
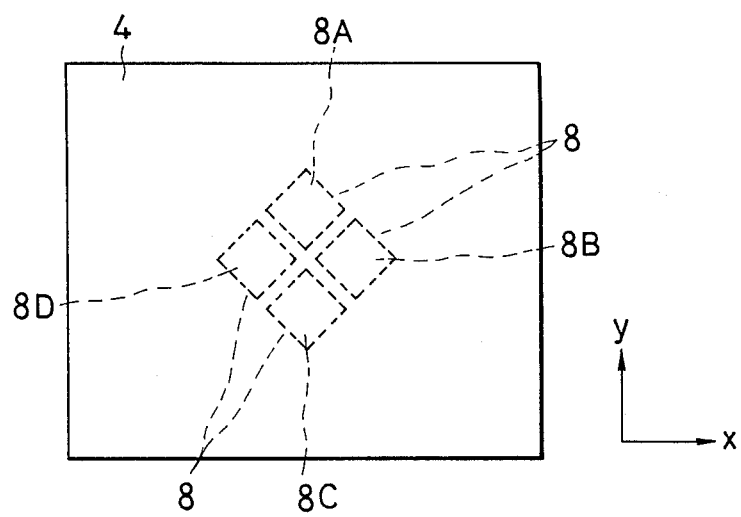
FIG. 4(b) is a front view with reflection elliptical Fresnel lens removed showing disposition of optical detector of the first embodiment.

FIG. 3 is a sectional view of a configuration of the first embodiment. In FIG. 3, a laser light 3 of wavelength $\lambda$ of 0.65 $\mu$m issued from a semiconductor laser 1 is collimated by a collimation lens 2 of diameter 5 mm and NA of 0.1, and the collimated light is led through a cubic beam splitter 4 having 9.8 mm edges; and the light is further led to pass through an objective lens 5 of 5 mm diameter and NA of 0.5, and thereby is converged on pits on an optical recording medium, such as optical disk 6. Return light reflected by the recording medium e.g. the pits of the optical disk 6 is again collimated by the objective lens 5, and is led into the beam splitter 4. The return light is then split into two light beam in the beam splitter 4, the first beam travels directly downwards, and the other beam is reflected by a half-mirror 4' in the beam splitter 4 changing direction by 90° to the right in FIG. 3, thereby entering a reflection elliptical Fresnel lens 7A of convergence type having diameter of e.g. 5 mm and having two focal lengths of 10 mm and 9.6 mm in the beam splitter 4 in major axis direction and in minor axis direction, respectively. The light beam incident to the reflection elliptical Fresnel lens 7A, which is formed on the side face (right vertical side face in FIG. 3), is reflected by the reflection elliptical Fresnel lens 7A, and converged on a photo-detector 8, which is a four-divided photodiode or the like photo-detector, formed on the opposite surface of the beam splitter 4 to the surface having the reflection elliptical Fresnel lens 7A. The light beam converged on the photo-detector 8 makes an astigmatic light image. Therefore, by processing outputs of the four-divided elements of the photo-detector 8, reproduced signal, focus error signal and tracking error signal are detected. That is to say, the optical head of the present embodiment has a configuration of folded light path type, wherein the light path from reflection elliptical Fresnel lens 7A to photo-detector 8 is folded by the Fresnel lens 7A and passes inside the beam splitter 4. Therefore, no redundant outside space like the prior art is necessary, and the space is drastically reduced. FIG. 4(a) shows a front view of the reflection elliptical Fresnel lens 7A formed on the side face of the beam splitter 4, and FIG. 4(b) shows disposition of the four-divided elements 8A, 8B, 8C and 8D of the photo-detector 8 formed on the side face opposite to the Fresnel lens 7A.

Further detailed configuration of the beam splitter and the Fresnel lens is as follows. The reflection elliptical Fresnel lens 7 has gratings of plural elliptical shapes, which gratings have groove depth of only several $\mu$m, and the pitches between neighboring grooves are gradually decreased as the grooves are more of the outer region. And, the gratings are covered with a reflection layer 71. As has been described, the elliptical Fresnel lens has different focal length in major direction and in minor direction; and when light is incident on the reflection elliptical Fresnel lens, the reflected light makes various shapes of focused spot on a vertical light receiving plane, which is the left side wall of the beam splitter 4. The focused spot changes its shape to horizontally oblong when the distance from the Fresnel lens is smaller and changes to a round spot, and further changes to vertically oblong one when the distance from the Fresnel lens becomes larger, as a result of astigmatism. The reflection elliptical lens 7A can be made by coating an electron beam resist such as CMS or PMMA on a transparent substrate, followed by electron beam exposure with electron dose distribution by using known electron-beam writing system, and further followed by known development. Thereby, the film thickness of the electron resist film is made to have a change of thickness in a direction perpendicular to the elliptical grooves of the Fresnel lens with relief shape of sawtooth cross section; and thereafter a thin film coating of Cr or Al or the like metal or dielectric polylayer thin film is made by evaporation or sputtering on the electron resist. When the reflection layer is made by sputtering, the deposition of the metal layer can be made at low temperature, and no substantial thermal effect is given to the lens 7, and hence, no deformation of the sawtooth cross section of the Fresnel lens 7 is induced. And therefore, focusing efficiency of the reflection Fresnel lens can be made almost 100%, excluding the reflection loss at the interface. It is confirmed that as the metal for the reflection layer, a layer using Ag is superior to the layers using Al or Au in smallness of reflection loss, thereby resulting in high efficiency of light utility.

To mass produce a Fresnel lens 7, a cast die of metal is made by using a Fresnel lens 7 made by electron beam lithography as the matrix, and many plastic Fresnel lenses can be made by casting transparent synthetic resin such as transparent epoxy resin, UV-hardening resin, PMMA, or the like therewith. By means of this process, mass-production of optical heads in accordance with the present invention can be accomplished. Furthermore, the Fresnel lens 7 can be made by mechanical working using a CNC engine lathe or by ion beam etch working. The Fresnel lens 7 made by electron beam lithography or focused ion beam lithography is made with high precision. The difference between the reflection Fresnel lens 7 used in this invention and the conventional transmission Fresnel lens is that the former has reflection layer 71 at the grated surface and the groove depth or slope inclination of the former is smaller than that of the latter. When the refractive index of the material constituting the Fresnel lens is n, wavelength of the laser light is λ, the depth of the groove for obtaining maximum amount of first order diffracted wave is given as $$d = \lambda/(2n) \quad (1).$$

Since the depth d' of the groove for obtaining the maximum amount of the first-order diffracted wave in the case of the transmission Fresnel lens is given by $$d' = \lambda/(n-1) \quad (2),$$

the depth d in accordance with the present invention is smaller being reduced into $(n-1)/(2n)$ of the conventional transmission Fresnel lens. When synthetic resin for the Fresnel lens is used, where the refractive index n is about 1.5, the depth of the groove of the present invention is reduced to $(n-1)/(2n) = 1/6$ of the depth d' of the conventional transmission Fresnel lens. And owing to such small depth of the groove, the reflection Fresnel lens of the present invention is far easier to manufacture in comparison with the transmission Fresnel lens. If the depth of the groove of the reflection Fresnel lens is selected to correspond to the conventional transmission Fresnel lens, its focal length becomes about 1/6 times that of the transmission Fresnel lens since in the reflection Fresnel lens the diffracted light of 6th order is maximum. And thus, a Fresnel lens of a shorter focal length than the transmission focal length is obtainable, and hence, a Fresnel lens of higher NA is easily manufacturable.

In this embodiment, by using the reflection elliptical Fresnel lens 7 of only several μm layer thickness as the optical element with astigmatic characteristics which is integral with the beam splitter 4, an optical head which is miniaturized, has good stability and does not require any adjustment of optical axis, can be constructed; and furthermore, even when the reflection elliptical Fresnel lens 7 and the splitter 4 are not made integral, the optical head can be made small. In another embodiment, a folded light beam may be made, by adopting a lens system which is a combination of a concave lens or a convex lens and a cylindrical lens as the optical element having astigmatic characteristics. An Al-coating is provided on the back side (right side of FIG. 3) of the combination lens, thereby constituting a reflection type astigmatic lens combination structure, apart from the above-mentioned integral configuration. Such structure is effective for miniaturization of the optical head.

The photo-detector 8 has PIN structure of amorphous Si, formed on the surface of the beam splitter 4 by depositing a transparent conductive film of ITO or ZnO of about 1000 Å thickness, and forming thereon a p-type Si film of about 150 Å by plasma CVD method, and further depositing thereon I-type Si film of about 4000 Å and n-type Si film of about 400 Å thickness in amorphous state. And by means of known photo-lithography the pattern of FIG. 4(b), which consists of four square patterns of each having 500 μm edges are formed with 10 μm cross-shaped gap therebetween to form the four-divided pattern, and further thereon Al-electrodes are formed. The four-divided photo-detector 8 may be made more easily by use of a P-N type structure or a Schottky structure, though response speed thereof are slower than the PIN configuration. Furthermore, in place of the amorphous Si, other Si compound e.g. amorphous SiGe or SiSn or SiGeSn may be used to extend sensibility to the infrared range such as λ=0.78 μm, though sensitivity in the visible range is lowered. That is, the photo-detector 8 is to be matched with the wavelength of the semiconductor laser 1. By making the photo-detector 8 integral with on the beam splitter 4 by utilizing the amorphous thin film configuration, the optical head can be made very small and its characteristic is stabilized and there is no requirement for light axis alignment. If the above-mentioned advantage of no-requirement of light axis is neglected, a photo-detector made as a single crystalline silicon device which is to be bonded or not to be bonded on the beam splitter 4 may be used.

Figure 5A:
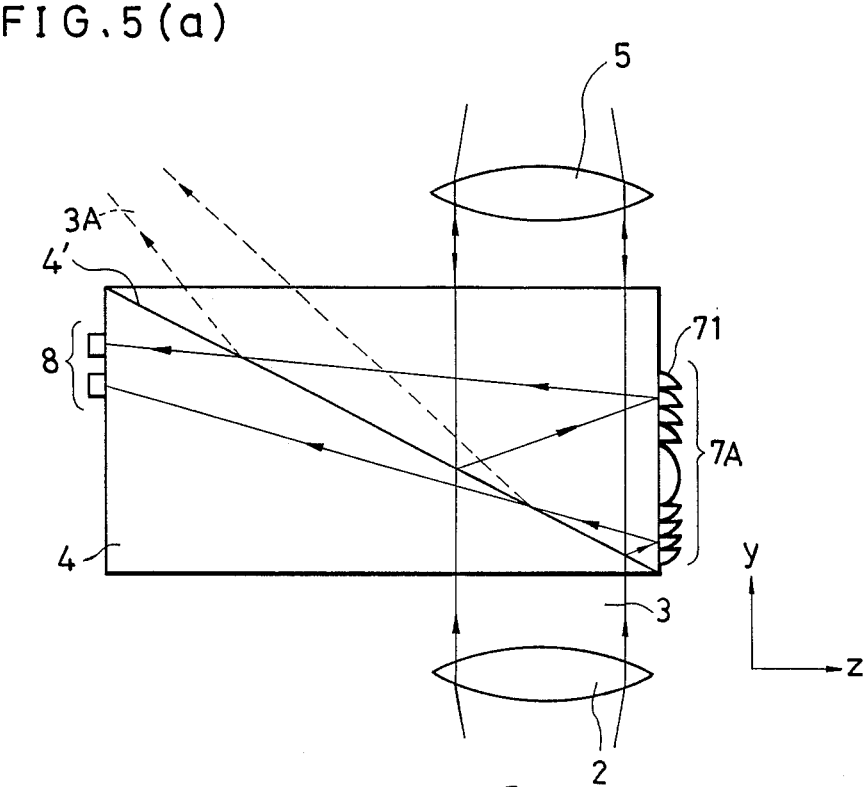
FIG. 5(a) is a sectional view showing laser light path in an optical head using rectangle shape beam splitter.
Figure 5B:
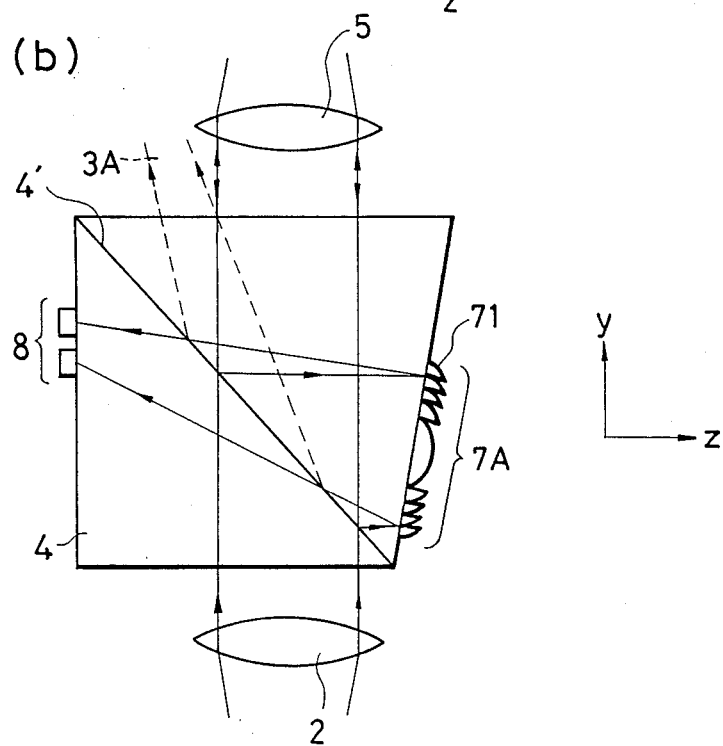
FIG. 5(b) is a sectional view showing laser light path in an optical head using non-rectangle shape beam splitter.

In the present embodiment, since the beam splitter 4 uses half-mirror 4' as the beam splitting means, the light beam is divided into two beams. First, the laser light 3 made collimated by the collimation lens 2 passes through the half-mirror 4' of the beam splitter 4 and about half of the light goes towards the optical disk 6. And the other half of the parallel light is reflected by the half-mirror 4' and goes leftwards to the photo-detector 8. Though the above-mentioned latter half light incident to the photo-detector 8 is useless, there is no problem of making undesirable noise on the photo-detector 8, since the reflected leftward-travelling light has constant intensity with respect to time. Next, among the return light reflected from the optical disk 6, about half of light passes through the half-mirror 4' and goes back to the semiconductor laser 1. And the return light incident to the semiconductor laser 1 can be utilized for making multi-mode operation of the semiconductor laser, and thereby is effective for stabilization of the oscillation. The light beam, which is induced by reflection of the return light from the optical disk 6 by the half-mirror 4' of the beam splitter 4, thereby turning the direction rightwards to the reflection elliptical Fresnel lens 7A, and after reflection by the reflection elliptical Fresnel lens 7A leftwards, and again reflected by the half-mirror 4' and hence towards the optical disk 6. The reflected light incident to the optical disk 6 has no substantial effect on the optical disk 6, because the last-mentioned refelected light by half-mirror 4' is subject to astigmatism, and further converged by the objective lens 5; and therefore this reflected light becomes out of focus state on the optical disk 6, and makes no substantial undesirable effect on the operation of the optical head, though slight background noise is induced by the last-mentioned reflection light. The beam splitter 4 in the above-mentioned embodiment of FIG. 3 is constructed to have a square shape on a sectional plane which is vertical to the plane of beam splitting half-mirror 4', but several other beam splitters may be used. FIG. 5(a) shows a modified beam splitter wherein the section on a sectional plane which is vertical to the plane of beam splitting half-mirror 4' is retangular; and FIG. 5(b) shows another modified example of the beam splitter wherein the face on which the reflection elliptical Fresnel lens 7A is formed is made oblique to the light axis of the incident collimated light, hence the outside shape of the beam splitter is trapezoid. By constructing the beam splitter in such a shape as shown in FIG. 5(a) and FIG. 5(b), the redundant reflected laser light 3A which is the light beam from the reflection elliptical Fresnel lens 7A and reflected by the beam splitting plane 4' travels out of the beam splitter 4 in the light path shown by the dotted lines which is led to a direction different from the objective lens 5 or the optical disk 6. Therefore, no undesirable influence is made on reading of pits on the optical disk 6 by such redundant reflected light, and accordingly background noise induced by such redundant reflected light beams is eliminated.

In another modified embodiment, the reflection elliptical Fresnel lens 7A is an off-axis Fresnel lens wherein, even when the incident laser light is on the optical axis of the Fresnel lens, the reflected output light is oblique to the incident light and creates astigmatism. Such off-axis Fresnel lens has a similar effect to the examples of FIG. 5(a) and FIG. 5(b) wherein the light reflected by the reflection elliptical Fresnel lens and further reflected by the light splitting plane is emitted with a certain angle to the direction of the original laser beam incident to the beam splitter.

Figure 6A:
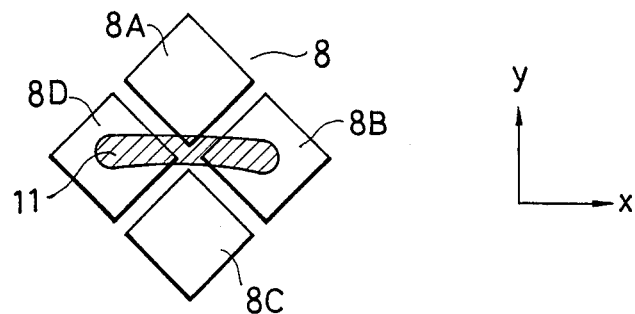
FIG. 6(a), FIG. 6(b) and FIG. 6(c) are front views showing relations of light spot projected on the optical detector of the first embodiment.
Figure 6B:
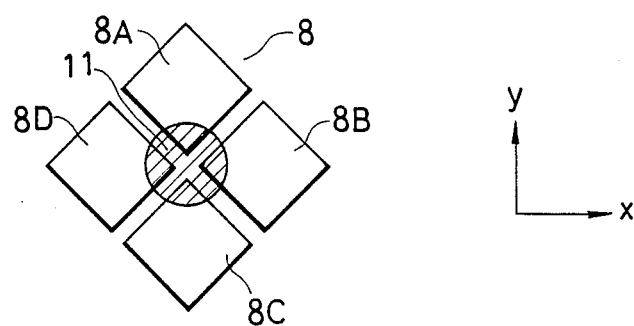
Figure 6C:
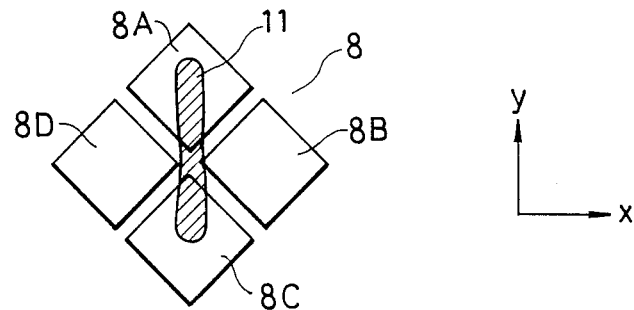

Next, the light-detection operation of the embodiments of FIG. 3 through FIG. 5(b) are elucidated with reference to FIG. 3 and FIG. 6. FIG. 6(a), FIG. 6(b) and FIG. 6(c) which show three varieties of light spot converged on the photo-detector 8. When the optical disk 6 is positioned accurately on the focal position of the objective lens 5, namely when the optical disk is in focus, the light spot is almost round as shown in FIG. 6(b), and therefore, four elements of the four-divided photo-detectors 8A, 8B, 8C and 8D receive equal amounts of light, and hence focus error signal, which is the difference between the outputs of the photodetection elements 8A and 8C, and those of the elements 8B and 8D, is zero. When the disk 6 is nearer than the in-focus position of the objective lens 5, the light spot changes to a horizontally oblong shape as shown in FIG. 6(a), and therefore the focus error signal becomes negative. When the optical disk is farther than the in-focus position, the light spot becomes a vertically oblong shape as shown in FIG. 6(c), and the focus error signal becomes positive value. Therefore, by utilizing the changes of the focus error signal which is the differences between the outputs of the elements 8A and 8C, and those of the elements 8B and 8D, which changes from a positive value, through zero and to a negative value, a focus servo operation can be made. The focus servo operation may be made even by using outputs of only two photo-detector elements, for instance, outputs of the elements 8A and 8B, outputs of elements 8B and 8C, outputs of 8C and 8D, or outputs of elements 8D and 8A. However, the aforementioned example of using all the four-divided elements can make the output signal stronger. Furthermore, signal reproduction of the information of the optical disk can be made by summing up the output of the optical detection elements 8A, 8B, 8C and 8D. Still furthermore, the tracking error signal can be detected by the known differential phase detection method or the heterodyne method.

Figure 7:
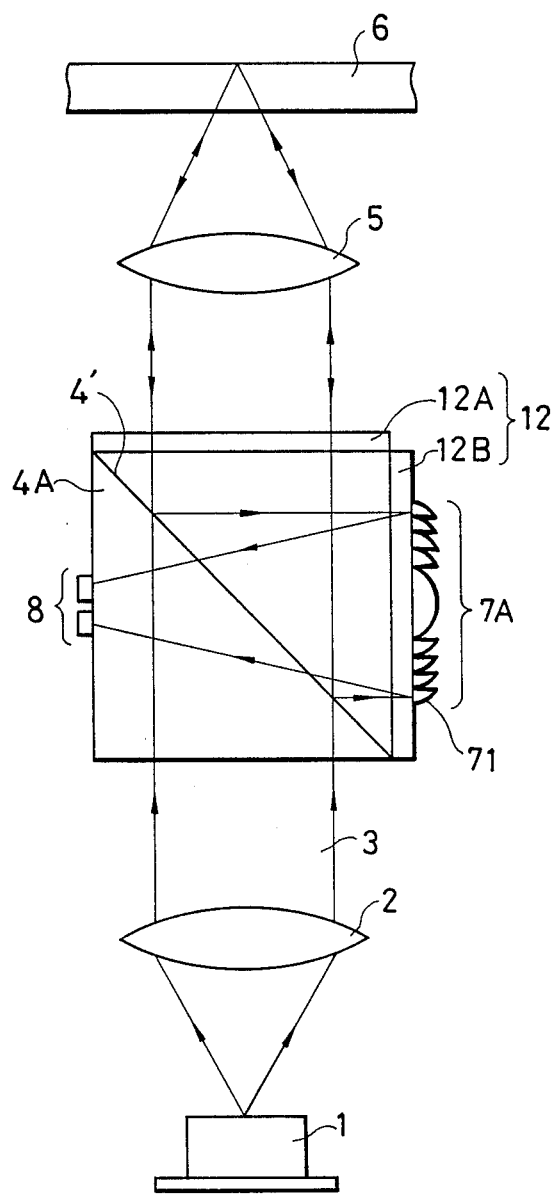
FIG. 7 is a sectional view showing an optical head of a second preferred embodiment of the present invention.

FIG. 7 shows a sectional view showing a second optical head, of the embodiment of the present invention. Corresponding parts and components to the first embodiment of FIG. 3 are shown by the same numerals and marks, and the description thereon made in the first embodiment similarly apply. Differences and features between this second embodiment and the first embodiment are as follows. A polarizing beam splitter 4A is used instead of the ordinary beam splitter 4 in the first embodiment; and a quater-wave plate 12A is provided between the upper face of the polarizing splitter 4A and the objective lens 5. And further, a second quater-wave plate 12B is provided between the right side face of the beam splitter 4A and the reflection elliptical Fresnel lens 7A. In this embodiment, the quater-wave plates 12A and 12B are bonded between the polarizing beam splitter 4A and the reflection elliptical Fresnel lens 7A or these three members are made an integral body, in order to make the optical system compact and stable and further to eliminate the need of optical axis alignment; but these members may be made separately if some reason requires such separate configuration. By using the combination of the quater-wave plates 12A and 12B and the polarizing beam splitter 4A, light efficiency from the beam splitter to the optical disk and also from the optical disk to the beam splitter 4A and to the photo-detector 8 thereof can be increased substantially up to almost 100%, and can achieve very high light efficiency. Furthermore, an undesirable laser beam is elminated, and light-detection of high SN ratio without background noise is attainable.

Figure 8:
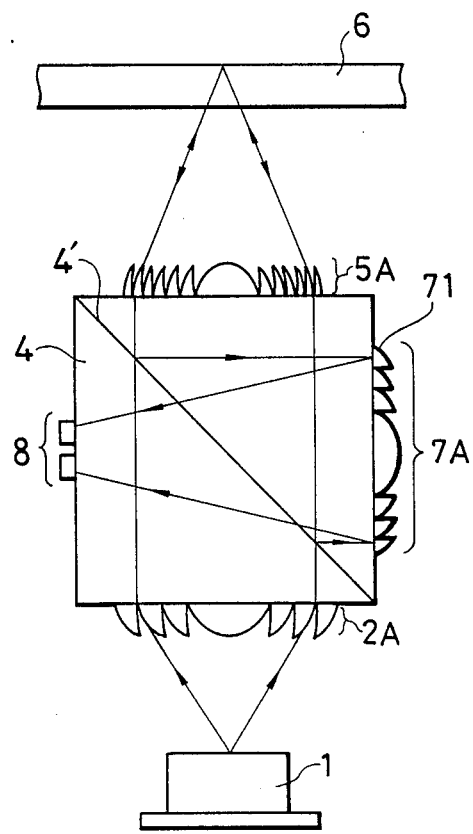
FIG. 8 is a sectional view showing an optical head of a third preferred embodiment of the present invention.

FIG. 8 shows a third embodiment of the present invention. Corresponding parts and components to the first embodiment of FIG. 3 are shown by the same numerals and marks, and the description thereon made in the first embodiment. Differences and features between this third embodiment and the first embodiment are as follows. A beam splitter 4 has a transmission circular collimation lens 2A of aperture 5 mm and NA of 0.1 on the lower face, and an objective lens, a transmission circular Fresnel lens 5A of aperture 5 mm and NA 0.5 integrally connected configuration, in addition to the reflection elliptical Fresnel lens 7A of the foregoing embodiments. The transmission circular Fresnel lenses can be made by substantially the same manufacturing method as used to manufacture the reflection elliptical Fresnel lens 7A, and all three Fresnel lenses 2A, 5A and 7A have layer thickness of several $\mu m$ or less. Therefore, an integral beam splitter 4 comprising three Fresnel lenses thereon can be made much smaller and advantages of stable optical operation and no need of light axis alignment are achievable.

Figure 9:
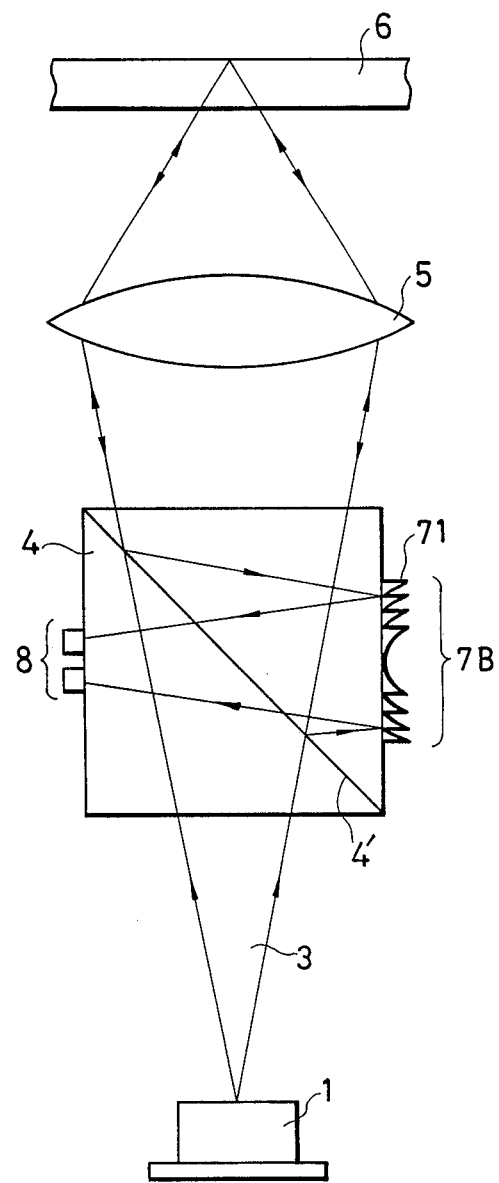
FIG. 9 is a sectional view showing an optical head of a fourth preferred embodiment of the present invention.

FIG. 9 shows a sectional view of an optical head of the fourth embodiment of the present invention. Corresponding parts and components to the first embodiment of FIG. 3 are shown by the same numerals and marks, and the description thereon made in the first embodiment similarly apply. The differences between this fourth embodiment and the first embodiment are as follows. This fourth embodiment of FIG. 9 does not have the collimation lens between the laser 1 and the beam splitter 4, and the laser beam which has passed through the beam splitter 4 is converged by the objective lens 5 and focused on the optical disk 6. And furthermore, a concave reflection elliptical Fresnel lens 7B is utilized instead of the convex reflection elliptical Fresnel lens 7A of the aforementioned examples. The concave reflection elliptical Fresnel lens 7B is an optical element which divergingly reflects laser beam incident thereto by creating astigmatism. The concave lens 7B is, as is obvious from the comparison between FIG. 3 and FIG. 9, consists of elliptical gratings with the same periods, but the sectional profile thereof is opposite to the sectional profile of the aforementioned reflection elliptical concave Fresnel lens 7A. The laser beam incident to the reflection elliptical Fresnel lens 7B is not collimated light, but a converging spherical wave; and the incident laser light of converging spherical wave is reflected to creating astigmatism and diverged by the concave reflection elliptical Fresnel lens 7B, and led to the photo-detector 8. The optical head in accordance with the present embodiment can be made more compact because the collimation lens is excluded, though optical axis alignment is more difficult than the optical head of the first embodiment.

Figure 10:
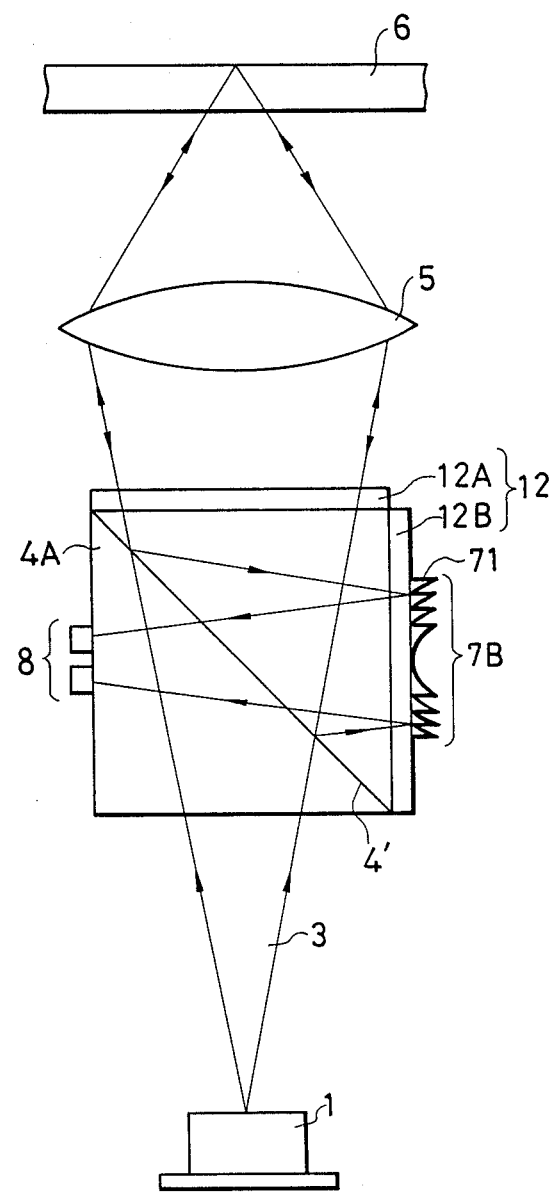
FIG. 10 is a sectional view showing an optical head of a fifth preferred embodiment of the present invention.

FIG. 10 shows a sectional view showing a fifth optical head of the embodiment of the present invention. Corresponding parts and components to the fourth embodiment of FIG. 9 are shown by the same numerals and marks, and the description thereon made in the fourth embodiment similarly apply. The difference between this fifth embodiment and the fourth embodiment are as follows. The beam splitter 4A in the fourth embodiment is a polarizing beam splitter, and quater-wave plates 12A and 12B are provided on the face opposing the objective lens 5 and on the side face providing the reflection elliptical concave Fresnel lens 7B in a manner to be inserted between the side face of the beam splitter 4A and the reflection elliptical concave Fresnel lens 7B. The effect is similar to the optical head of the second embodiment.

Figure 11:
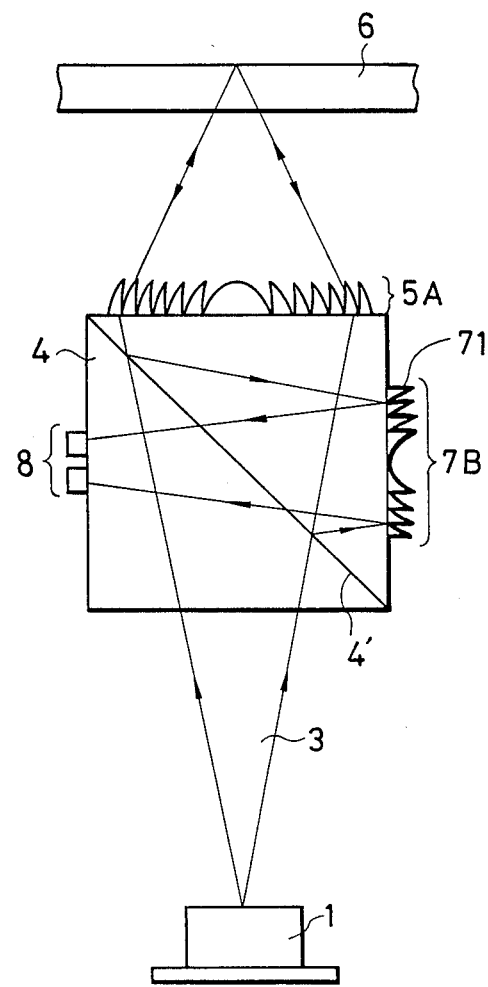
FIG. 11 is a sectional view showing an optical head of a sixth preferred embodiment of the present invention.

FIG. 11 shows a sectional view of a sixth embodiment of the optical head of the present invention. Corresponding parts and components to the fourth embodiment of FIG. 9 are shown by the same numerals and marks, and the description thereon made in the fourth embodiment similarly apply. The difference between this sixth embodiment and the fourth embodiment are as follows. In this embodiment, the objective lens 5A is provided on the upper surface of the beam splitter as transmission convex Fresnel lens 5A formed integrally on the beam splitter 4. The technical advantage of this embodiment is miniaturization of the optical head similar to the third embodiment of FIG. 8.

On the aforementioned first through sixth embodiments, other configurations of the optical head made by combining respective constructional features of the aforementioned embodiments may be realizable, and such combined embodiment can result in combined advantages.

Under certain conditions, for instance, where a distance between the semiconductor laser 1 and the beam splitter 4 is long or there is a collimator lens provided on the light-incident face of the beam splitter, the concave type reflection elliptical Fresnel lens 7b may be replaced by a convex type reflection elliptical Fresnel lens 7A. Furthermore, the optical head configuration can be modified such that the side which faces the semiconductor laser 1 and the side which faces the elliptical Fresnel lens 7 can be replaced each other, and such optical head has the advantage of short size of the vertical direction from the optical disk to the beam splitter 4.

Apart from the above-mentioned first through sixth embodiments wherein astigmatic method is realized as the focus servo means, other embodiments can be made by adopting Foucault method for the focus servo means is elucidated in the following seventh, eighth, . . . , through twelfth embodiments.

FIG. 12 shows an optical head in accordance with the seventh embodiment of the present invention. In FIG. 12, a laser light 3 of wavelength $\lambda$ of 0.65 $\mu$m issued from a semiconductor laser 1 is led through a cubic beam splitter 4 having 10 mm edges, and further led to pass through an objective lens 5 of 5 mm diameter and NA of 0.1, and thereby converged on pits on an optical recording medium, such as optical disk 6. Return light reflected by the recording medium, e.g. the pits of the optical disk 6 is again converged by the objective lens 5, and is led into the beam splitter 4. The return light is then split into two beams in the light splitter 4, the first beam travels directly downwards, and the other one is reflected by a half-mirror 4' in the beam splitter 4 changing direction by 90° to rightwards of FIG. 12, thereby entering a reflection cylindrical Fresnel lens 13 which comprises two convex reflection Fresnel lenses 13A and 13B disposed in vertical direction (Y) of FIG. 12, each having a size of 2.5 mm in Y-direction×5 mm in X-direction (perpendicular to the plane of paper) formed integral on the side face of the beam splitter 4. The light incident to the convex reflection Fresnel lenses is reflected leftwads, and is divided into two beams and converged in vertical (Y) direction only by the Fresnel lenses 13A, 13B, and converged on photodetector 15 which comprises two pairs of photo-detector elements 15A and 15B and 15C and 15D) disposed in vertical (Y) direction of FIG. 12. Then, by processing output signals of respective photo-detector elements 15A through 15D, reproduction signal (RF read out signal), focus error signal and tracking error signal are obtained. For example, the reproduction signal is obtained by summing up outputs of all four photo-detector elements 15A through 15D; the force error signal is the difference of the outputs between 15A and 15B, or 15C and 15D; and the tracking error signal is the difference of the outputs of 15A and 15B, and the outputs of 15C and 15D.

Figure 13:
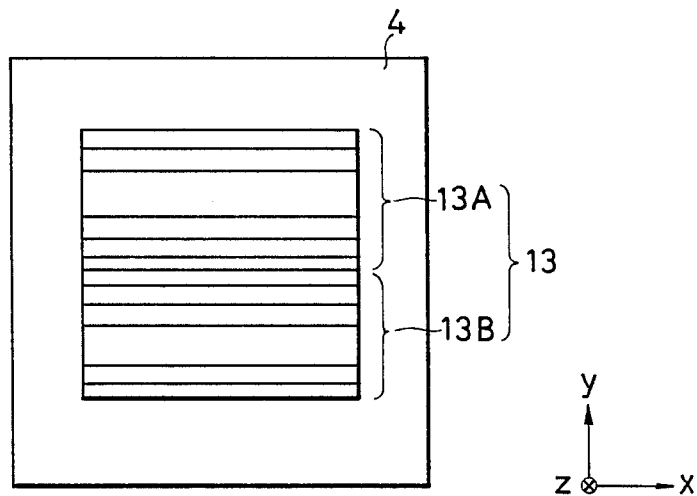
Figure 13:
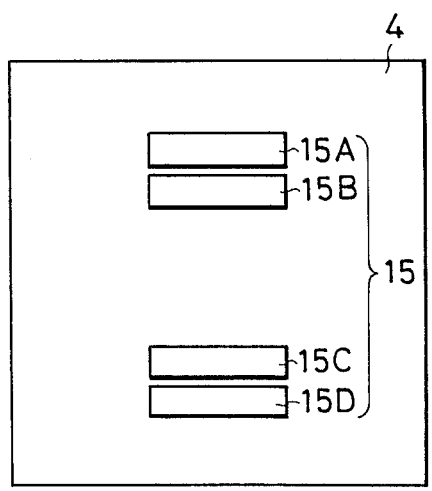

Accordingly, the optical head of the present embodiment has a configuration of folded light path type, wherein light path from reflections cylindrical Fresnel lens 13 to photo-detector 15 is folded by the Fresnel lens 13 and passes inside the beam splitter 4. Therefore, no redundant outside space like the prior art is necessary, and the space is drastically reduced. FIG. 13(a) shows a front view of the reflection cylindrical Fresnel lens formed on the side face of the beam splitter 4, and FIG. 13(b) shows disposition of the four elements 15A, 15B, 15C, 15D of the photo-detector 15 formed on the side face opposite to the Fresnel lens 13.

Further detailed configurations of the splitter and the Fresnel lens are as follows. The reflection cylindrical Fresnel lens 13 comprises a pair of reflection cylindrical Fresnel lenses 13A and 13B, which are disposed in vertical row. Respective reflection cylindrical Fresnel lenses 13A and 13B have linear parallel gratings, which have groove depth of only several μm, and the pitches between neighboring grooves are gradually decreased as the grooves move outward (namely upper and lower from respective center horizontal line). And, the gratings are covered with a reflection layer. When light is incident on the reflection cylindrical Fresnel lens, the reflected light is converged in vertical direction only and is projected on a vertical light receiving plane, which is the left side wall of the beam splitter 4. In a modified embodiment, a focusing grating which consists of a construction of a part of the reflection cylindrical Fresnel lens can be used for carrying out the same function.

The reflection cylindrical lens 13 can be made by coating an electron beam resist such as CMS or PMMA on a transparent substrate, followed by electron beam exposure with electron dose distribution by using known electron-beam writing system, and further followed by known development. Thereby, the film thickness of the electron resist film is made to have a change of thickness in a direction perpendicular to the elliptical grooves of the Fresnel lens of relief shape of sawtooth cross section; and thereafter a thin film coating of Cr or Al or the like metal or dielectric polylayer thin film is made by evaporation or sputtering on the electron resist. Especially, when the reflection layer is made by sputtering, the deposition of the metal layer can be made in low temperature, and no substantial thermal effect is given to the lens 13, and hence, no deformation of the sawtooth cross section of the Fresnel lens 13 is induced. And therefore, focusing efficiency of the reflection Fresnel lens is above 80%, excluding the reflection loss at the interface. It is confirmed that as the metal for the reflection layer, a layer using Ag is superior to the layers using Al or Au in smallness of reflection loss, thereby resulting in high efficiency of light utility.

To mass produce the Fresnel lens, a cast die of metal is made by using a Fresnel lens 13 made by electron beam lithography as matrix, and a many plastic Fresnel lenses can be made by casting of transparent synthetic resin such as transparent epoxy resin, UV-hardening resin, PMMA, or the like therewith. By means of this process, mass-production of optical head in accordance with the present invention can be made. Furthermore, the Fresnel lens can be made by mechanical working by CNC engine lathe or ion beam etch working. The Fresnel lens made by electron beam lithography or focused ion beam lithography is made with high precision.

In this embodiment, by using the reflection cylindrical Fresnel lens 13 of only several μm layer thickness as the optical element with astigmatic characteristics being integral with the beam splitter 4, an optical head which is miniaturized, has good stability and excluding necessity of adjustment of optical axis, can be made; and furthermore, even when the reflection cylindrical Fresnel lens 13 and the splitter 4 are not made integral, the optical head can be made small.

The photo-detector 15 has PIN structure of amorphous Si, and formed on the surface of the beam splitter 4, by depositing a transparent conductive film of ITO or ZnO of about 1000 Å thickness, and forming thereon a p-type Si film of about 150 Å by plasma CVD method, and further depositing thereon I-type Si film of about 4000 Å and n-type Si film of about 400 Å thickness in amorphous state. And by means of known photo-lithography the pattern of FIG. 13(b), which consists of two-divided (upper and lower) rectangular patterns each having 250 μm, 500 μm heights and width edges, are formed with a 10 μm horizontal gap therebetween to form the two-divided pattern, and further thereon Al-electrodes are formed. The two-divided photo-detector 15 may be made more easily by use of P-N type structure or Schotky structure, though response speed thereof is slower than the PIN configuration. Furthermore, in place of the amorphous Si, other Si compound e.g. amorphous SiGe or SiSn or SiGeSn may be used to extend sensibility to inflated range such as $\lambda = 0.78$ μm, though sensitivity in visible range is lowered. That is, the characteristic of the photo-detector 15 is to be matched with the wavelength of the semiconductor laser 1. By making the photo-detector 15 integral with the beam splitter 4 by utilizing the amorphous thin film configuration, the optical head can be made very small and its characteristic is stabilized and there is no requirement of light axis alignment. If the above-mentioned advantage of no-requirement of light axis is neglected, a photo-detector made as a single crystalline silicon device which is to be bonded or not to be bonded on the beam splitter 4 may be used.

Figure 14:
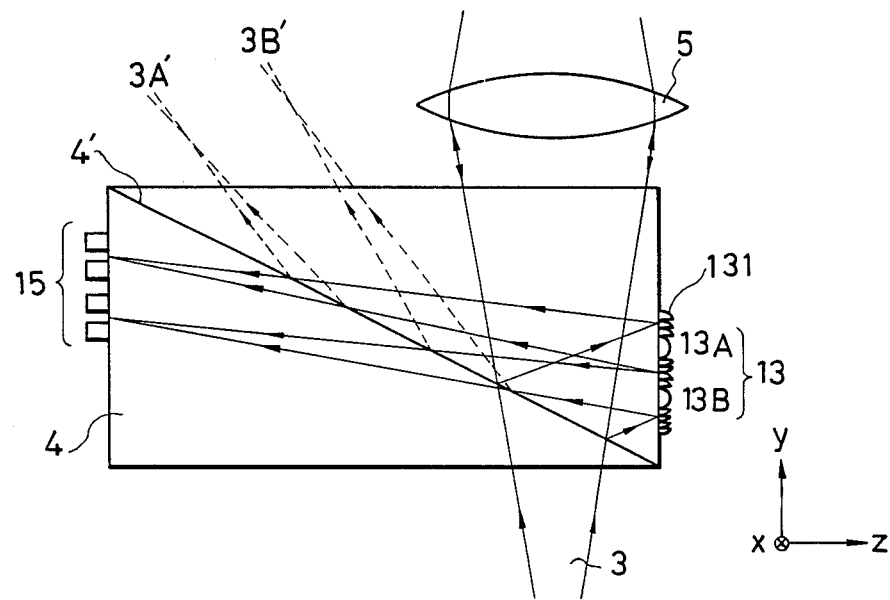
Figure 14:
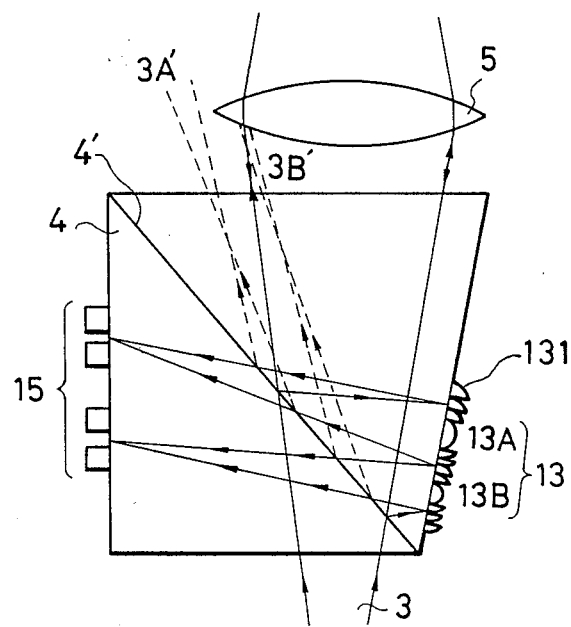

In the present embodiment, since the beam splitter 4 uses half-mirror 4' as the beam splitting means, the light beam is divided into two beams. First, the laser light 3 emitted from the semiconductor laser 1 is led in and passes through the half-mirror 4' of the beam splitter 4, and about half of the light goes towards the optical disk 6. And the other half of the collimated light is reflected by the half-mirror 4' and goes leftwards to the photo-detector 15. Though the above-mentioned latter half light incident to the photo-detector 15 is useless, there is no problem of making undesirable noise on the photo-detector 15, since the reflected leftwards-travelling light has constant intensity with respect to time. Next, among the return light reflected from the optical disk 6, about half the amount of light passes through the half-mirror 4' and goes back to the semiconductor laser 1. The return light incident on the semiconductor laser 1 can be utilized for making multi-mode operation of the semiconductor laser, and thereby is effective for stabilization of the oscillation. The light beam, which is induced by reflection of the return light from the optical disk 5 by the half-mirror 4' of the beam splitter 4, thereby turning the direction rightwards to the reflection cylindrical Fresnel lens 13, and after reflection by the reflection cylindrical Fresnel lens 13 leftwards, and again reflected by the half-mirror 4' and hence towards the optical disk 6. The reflected light incident to the optical disk 6 makes no substantial effect on the optical disk 6, because the last-mentioned reflected light by half-mirror 4' is subject to astigmatism, and further converged by the objective lens 5; and therefore this reflected light is out of focus state on the optical disk 6, and makes no substantial undesirable effect on the operation of the optical head, though negligibly small background noise is induced by the last-mentioned reflection light. The beam splitter 4 in the above-mentioned embodiment of FIG. 12 is constructed to have a square shape on a sectional plane which is vertical to the plane of beam splitting half-mirror 4', but several other beam splitters may be used. FIG. 14(a) shows a modified beam splitter wherein the section on a sectional plane which is vertical to the plane of beam splitting half-mirror 4' is rectangle; and FIG. 14(b) shows another modified example of the beam splitter wherein the face on which the reflection elliptical Fresnel lens 13 is formed is made oblique to the light axis of the incident collimated light, hence the outside shape of the beam splitter is trapezoid. By constructing the beam splitter so as to be shaped as shown in FIG. 14(a) and FIG. 14(b), the redundant reflected laser beams which are the light beam from the reflection cylindrical Fresnel lenses 13A and 13B and reflected by the beam splitting plane 4' goes out of the beam splitter 4 in the light path 3A' and 3B' shown by the dotted lines which is led to a direction different from the objective lens 5 or the optical disk 6. Therefore, no undesirable influence is made on reading of pits on the optical disk 6 by such redundant reflected light, and accordingly background noise induced by such redundant reflected light beams is eliminated.

In another modified embodiment, the reflection elliptical Fresnel lens 13 is constructed as an off-axis Fresnel lens wherein, even when the incident laser light is on the optical axis of the Fresnel lens, the reflected output light is oblique to the incident light and creates astigmatism. Such off-axis Fresnel lens makes similar effect to the examples of FIG. 14(a) and FIG. 14(b) wherein the light reflected by the reflection cylindrical Fresnel lens and further reflected by the light splitting plane is emitted with a certain angle to the direction of the original laser beam incident to the beam splitter.

Figure 15A:
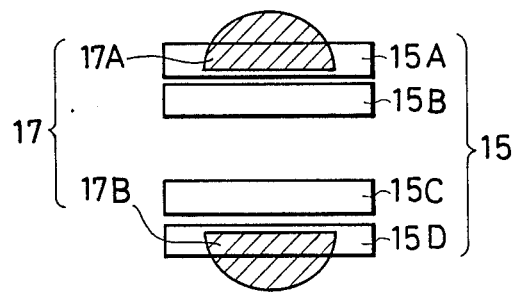
FIG. 15(a), FIG. 15(b) and FIG. 15(c) are front views showing relations of light spots projected on the optical detector of the seventh embodiment.
Figure 15B:
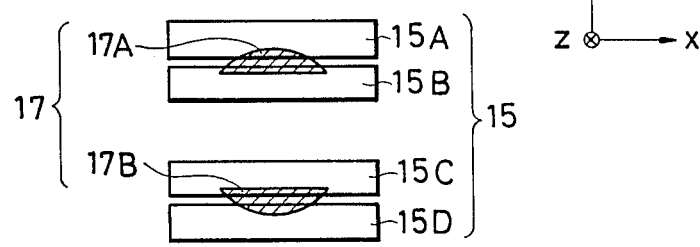
Figure 15C:
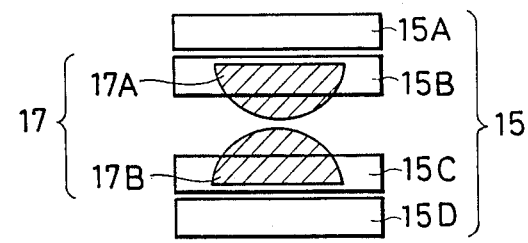

Next, the light-detection operation of the embodiments of FIG. 12 through FIG. 14(b) are elucidated with reference to FIG. 12 and FIG. 15. FIG. 15(a), FIG. 15(b) and FIG. 15(c) show three varieties of light spot converged on the photo-detector 15. When the optical disk 6 is positioned accurately on the focal position of the objective lens 5, namely when the optical disk is in focus, the light spots 17A and 17B are vertically narrow and lie balanced on the photo-detectors 15A and 15B and on the photo-detectors 15C and 15D as shown in FIG. 15(b). And therefore, four elements of the four divided photo-detectors 15A, 15B, 15C and 15D receive substantially equal amounts of light, and hence focus error signal which is a difference between the outputs of the photodetection elements 15A and 15B or 15C or 15D is zero. When the disk 6 is nearer than the in-focus position of the objective lens 5, the light spots 17A and 17B become out of focus and the light spots 17A and 17B move vertically outwards, thereby incident almost only to the photo-detectors 15A and 15D as shown in FIG. 6(a), and therefore the focus error signal becomes positive. When the optical disk is farther than the in-focus position, the light spots 17A and 17B becomes out of focus and the light spots 17A and 17B move vertically inwards, thereby incident almost only to the photo-detectors 15B and 15C as shown in FIG. 6(c), and the focus error signal becomes a negative value. Therefore, by utilizing the changes of the focus error signal which is the differences between the outputs of the elements 15A and 15B, or the elements 15C and 15D, which changes from a positive value, through zero and to a negative value, a focus servo operation can be made. Furthermore, signal reproduction of the information of the optical disk can be made by summing up the output of the optical detection elements 15A, 15B, 15C and 15D. Tracking error signal can be made by known push-pull method, which utilizes a phenomenon that an inbalance of intensity distributions of reflected light is produced when the light spot on the optical disk 6 focused by the objective lens 5 makes a misregistration from the center line of the signal track on the optical disk 6. The tracking error signal is made by subtracting the sum of outputs of photo-detector elements 15C and 15D from sum of outputs of photo-detector elements 15A and 15D. And the tracking error signal is zero when the light spot lies at the center line of the signal track, and the track error signal becomes positive or negative when the light spot deviates on one side or the opposite side from the center line. Therefore, by utilizing the tracking error signal, a tracking servo-control can be made.

In this embodiment, a photo-detector consisting of two pairs of each two-divided photo-detector element configuration is used; but so far as is capable of carrying out focus servo-control and tracking servo-control, any other configuration of photo-detector can be used. It is sufficient that there is one photo-detector of two-divided configuration for the focus servo-control, and for the tracking servo-control a configuration of two pairs is enough.

In the above-mentioned embodiment, as the reflection optical element for dividing the light beam at least in two, reflection cylindrical Fresnel lens is used. Since the optical element can make light converging and light diverging action in one direction depending on the convex type or concave type of the cylindrical lens, convergence of light beam on the photo-detector 15 can be made irrespective of the positional relation between the semiconductor laser 1 and the beam splitter 4. Furthermore, even when circular or elliptical reflection Fresnel lens is used as the reflection optical element, the similar effect is obtainable, though manufacturing thereof is more difficult than the reflection cylindrical Fresnel lens.

The concave reflection Fresnel lens is similarly obtainable by oppositely changing the cross-section profile of the Fresnel lens 13 to that of the convex reflection cylindrical Fresnel lens 13 shown in FIG. 12.

Figure 16:
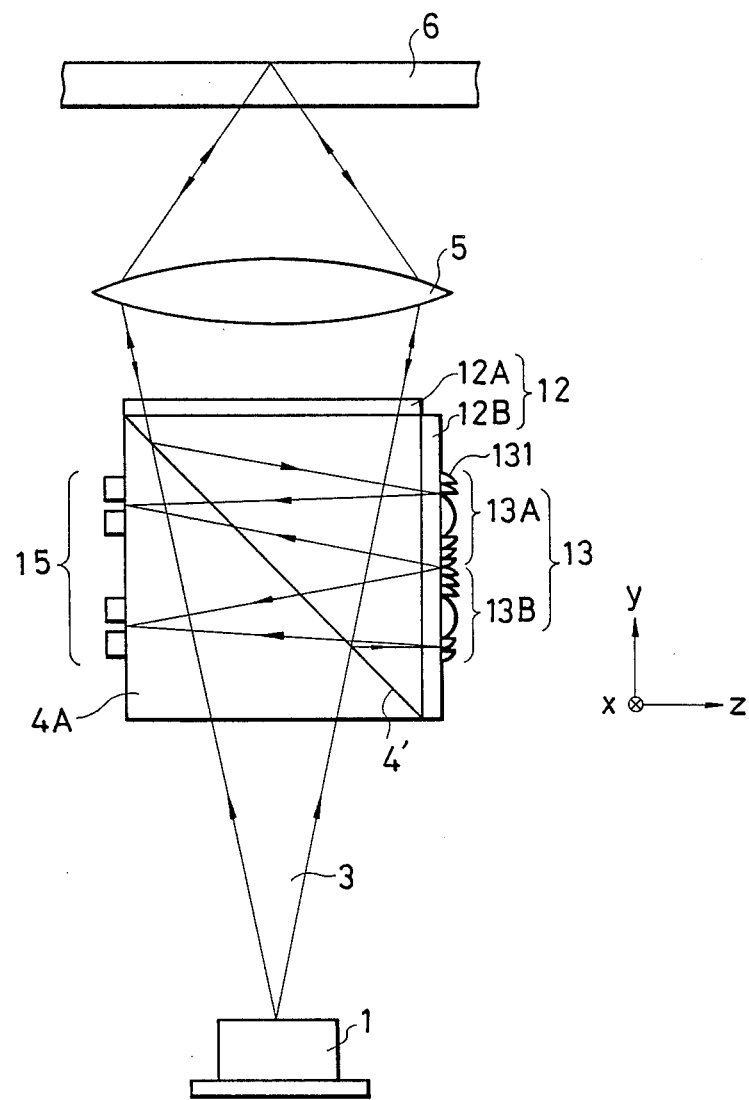
FIG. 16 is a sectional view of a configuration of an eighth embodiment.

FIG. 16 shows a sectional view showing an eighth optical head of the embodiment of the present invention. Corresponding parts and components to the seventh embodiment of FIG. 12 are shown by the same numerals and marks, and the description thereon made in the first embodiment similarly apply. The difference between this eighth embodiment and the seventh embodiment are as follows. A polarizing beam splitter 4A is used instead of the ordinary beam splitter 4 in the seventh embodiment; and a quater-wave plate 12A is provided between the upper face of the polarizing splitter 4A and the objective lens 5. And further, a second quater-wave plate 12B is provided between the right side face of the beam splitter 4A and the reflection cylindrical Fresnel lens 13. In this embodiment, the quater-wave plate 12B is bonded between the polarizing beam splitter 4A and the reflection cylindrical Fresnel lens 13 or these three members are made in integral body, in order to make the optical system compact and stable and further to eliminate the need for optical axis alignment; but these members may be made separately if some reason requires such separate configuration. By using the combination of the quater-wave plates 12A and 12B and the polarizing beam splitter 4A, light efficiency from the beam splitter to the optical disk and also from the optical disk to the beam splitter 4A and to the photo-detector 15 thereof can be increased substantially up to almost 100%, and can achieve very high light efficiency. Furthermore, undesirable laser beam is eliminated, and light-detection of high SN ratio without background noise is attainable.

Figure 17:
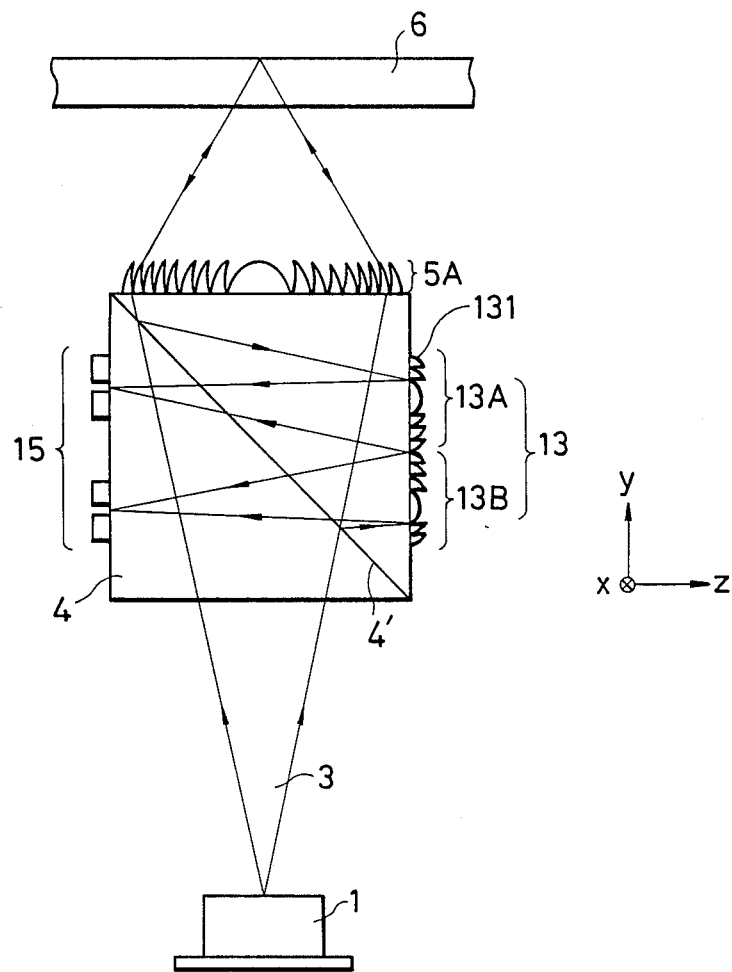
FIG. 17 is a sectional view of a configuration of a ninth embodiment.

FIG. 17 shows a ninth embodiment of the present invention. Corresponding parts and components to the seventh embodiment of FIG. 12 are shown by the same numerals and marks, and the description thereon made in the seventh embodiment similarly apply. Differences between this ninth embodiment and the seventh embodiment are as follows. A beam splitter 4 has an objective lens a transmission circular Fresnel lens 5A of aperture 5 mm and NA 0.5 in integral configuration, besides the reflection cylindrical Fresnel lens 13 of the abovementioned embodiment. The transmission circular Fresnel lens 5A can be made by substantially the same manufacturing method to the reflection cylindrical Fresnel lens 13, and both the Fresnel lenses 13 and 5A have layer thickness of several μm or less. Therefore, an integral beam splitter 4 comprising three Fresnel lenses thereon can be made easily and stable optical operation is achieved with no need for light axis alignment.

Figure 18:
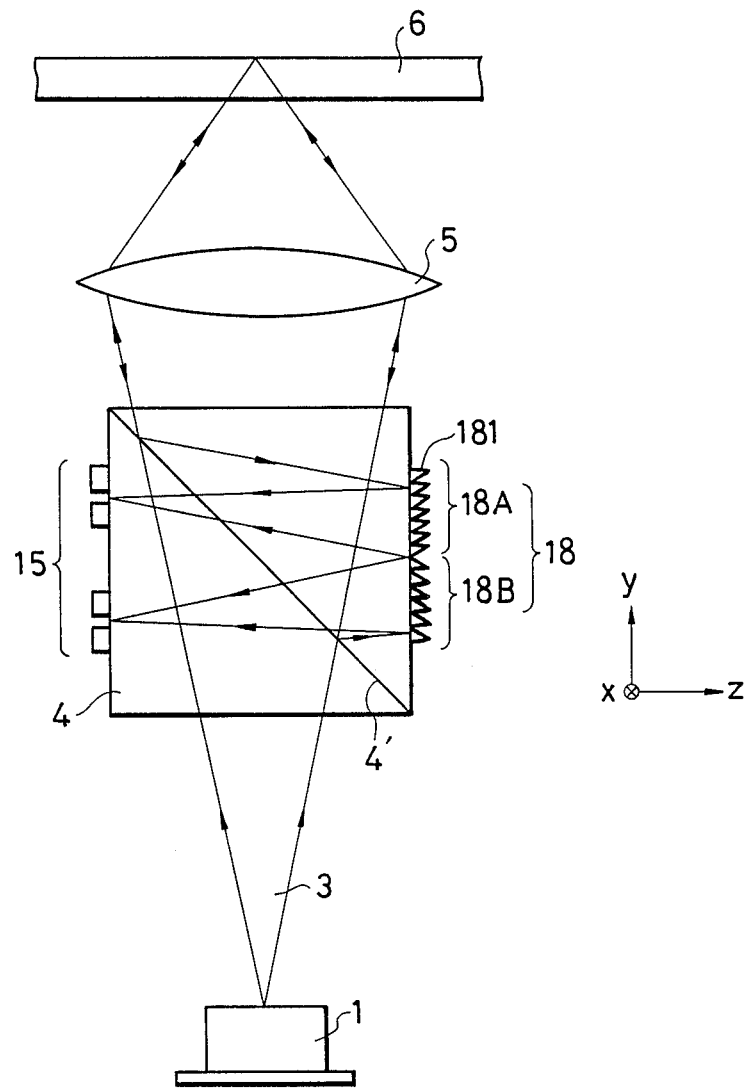
FIG. 18 is a sectional view of a configuration of a tenth embodiment.

FIG. 18 shows a sectional view of an optical head of a tenth embodiment in the present invention. Corresponding parts and components to the seventh embodiment of FIG. 12 are shown by the same numerals and marks, and the description thereon made in the seventh embodiment similarly apply. Differences of this tenth embodiment from the seventh embodiment are as follows. This tenth embodiment of FIG. 18 has reflection grating 18 consisting of two reflection gratings 18A and 18B which are formed integral with the beam splitter 4. This rofootion grating I8 is a linear grating with uniform period. And as shown in FIG. 18, the grating grooves in the X-axis direction are made parallelly, and sawtooth relief shapes of the gratings 18A and 18B are disposed in symmetry with each other. And on the surface of the sawtooth grating, reflection layer 19 is deposited. As shown by this embodiment, by using the linear reflection grating with uniform period, the manufacturing of the grating becomes easier than the aforementioned reflection Fresnel ranges. If desired modified gratings having variations of period can be adopted. For instance, as one grating of the period-changing grating, the reflection cylindrical Fresnel lens disclosed in the seventh embodiment is classified.

As the reflection grating 18, such grating as linear grating with uniform period wherein cross-sectional profile of the grating is, for instance, rectangular, an isosceles triangle, sinusoidal shape or such symmetrical shape. In such grating, lowest point of the bottom and highest point of the peak of the shape lie at substantial center part of the bottom and the peak, respectively, and such grating generates diffraction light almost in symmetry, and both of +1 order light and −1 order light can be utilized. Accordingly, there is no use of making the sawtooth shapes of the respective elementally cylindrical lens parts 18A and 18B disposing in each other opposite directions. That is, by using only one grating, function of the two-divided grating elements 18A and 18B can be made, and therefore manufacturing becomes easier. One slight disadvantage of such reflection grating is that by generation of higher order lights as ±2 order and ±3 order, . . . , the utility of light is slightly lower than the afore-mentioned embodiments.

Figure 19:
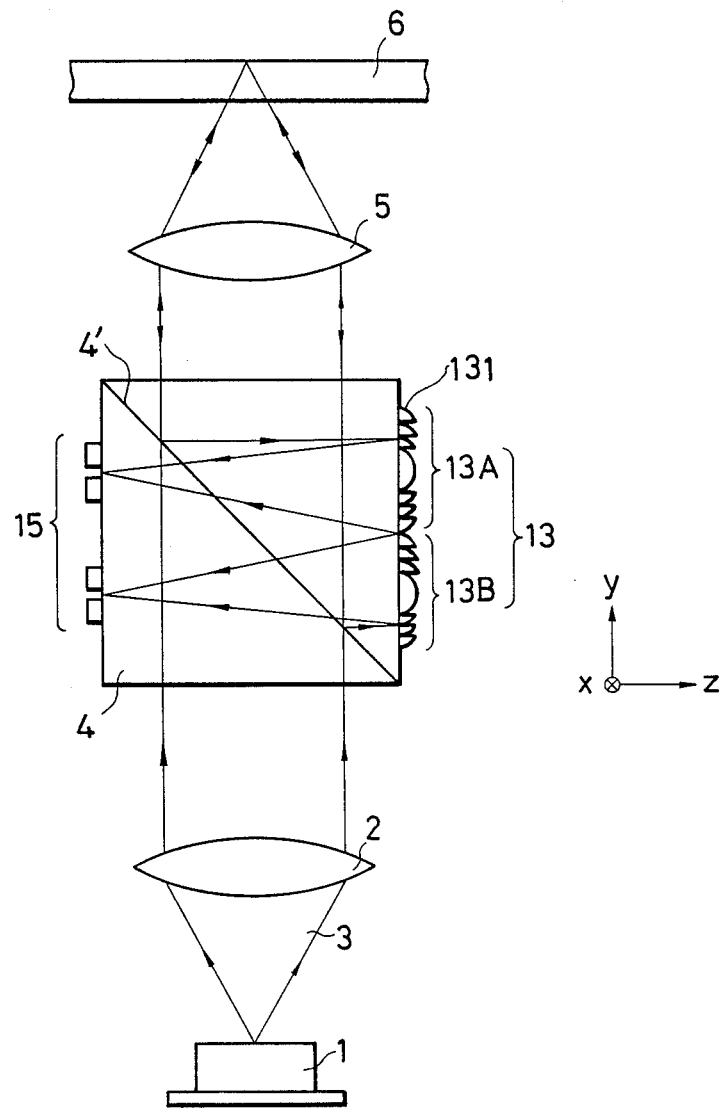
FIG. 19 is a sectional view of a configuration of an eleventh embodiment.

FIG. 19 shows a sectional view showing eleventh embodiment of the present invention. Corresponding parts and components to the seventh embodiment of FIG. 12 are shown by the same numerals and marks, and the description thereon made in the seventh embodiment. The difference between this eleventh embodiment and the tenth embodiment is that a collimator lens 2 is provided between the semiconductor laser 1 and the lower face of the beam splitter 4. In this embodiment, the laser light in the beam splitter 4 is collimated until entering the reflection cylindrical Fresnel lens 13, and therefore, alignment of the light axis is very easy. For the reflection optical element for dividing the light beam after the reflection, the function of converging the light beam in the vertical (Y) direction is necessary, and therefore a Fresnel lens or converging grating is effective as the optical element.

Figure 20:
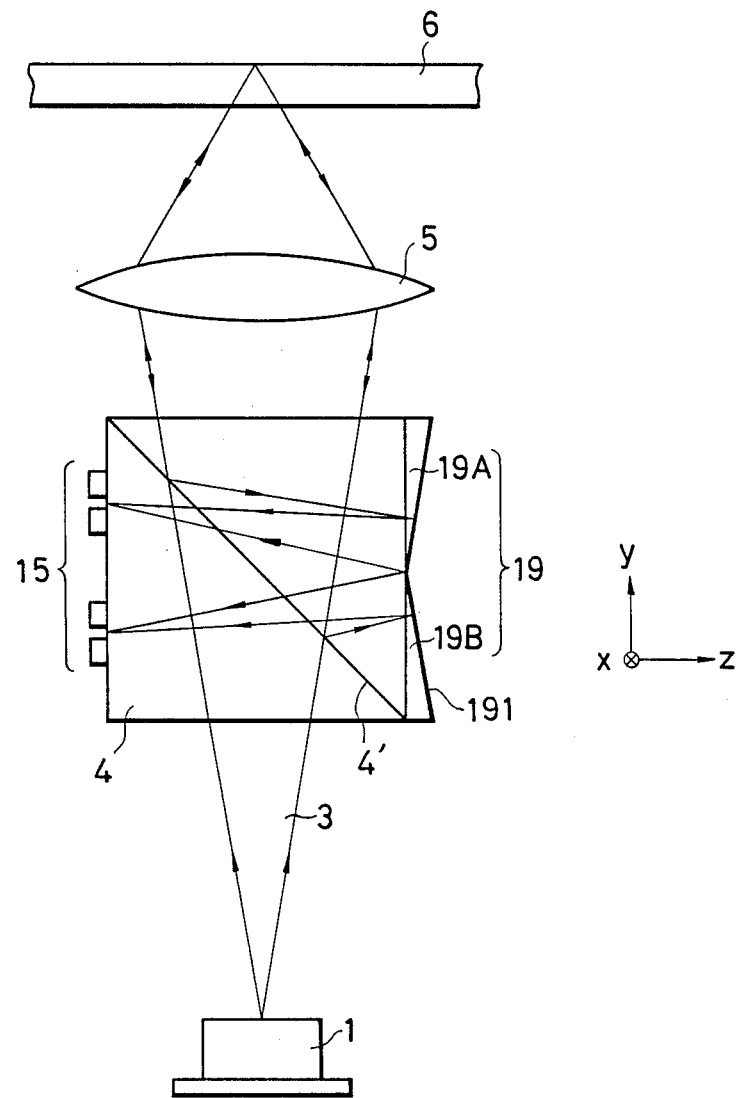
FIG. 20 is a sectional view of a configuration of a twelfth embodiment.

FIG. 20 shows a sectional view showing a twelfth embodiment of the present invention. Corresponding parts and components to the seventh embodiment of FIG. 12 are shown by the same numerals and marks, and the description thereon made in the seventh embodiment similarly apply. The difference between this twelfth embodiment and the seventh embodiment is that a, reflection prism 19 comprising two prisms 19A and 19B of mutually symmetric disposition is used as shown in FIG. 20, and these have reflection layers similar to the foregoing embodiments. By means of this pair prisms 19A and 19B, the splitted and 90° turned light beam is divided into two reflected beams, which are led to the upper photo-detectors 15A and 15B and the lower photo-detectors 15C and 15D, respectively.

In addition to the aforementioned seventh through twelfth embodiments, other configurations of the optical head made by combining respective constructional features of the aforementioned embodiments may be realizable, and such combined embodiments can perform the combined advantages.

Figure 22:
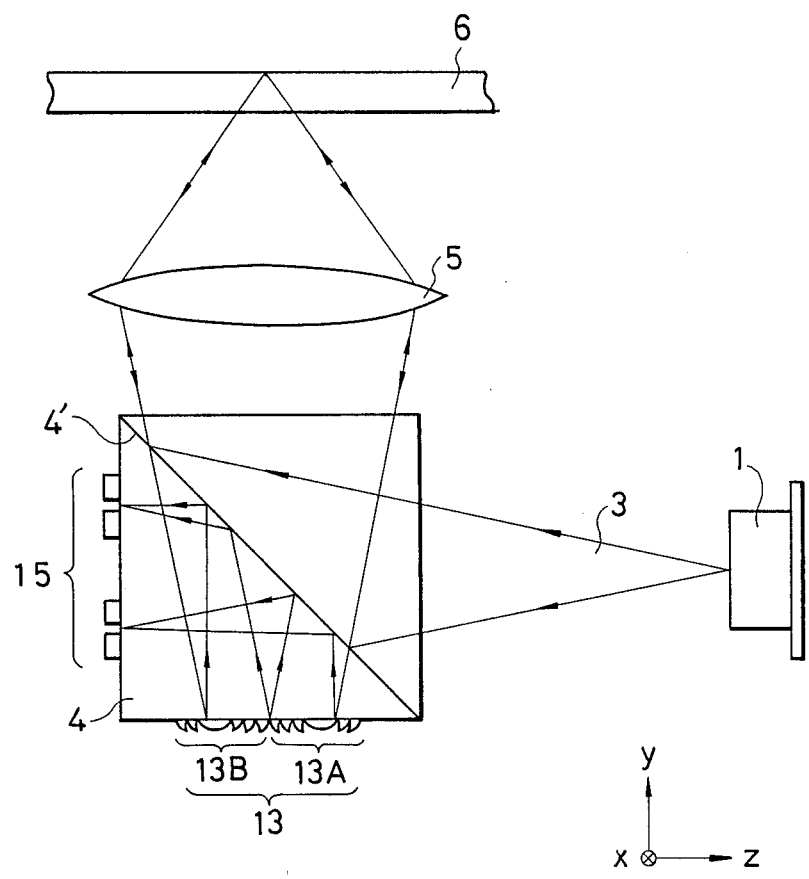
FIG. 22 is a sectional view of a fourteenth embodiment.

FIGS. 21 and 22 show thirteenth and fourteenth embodiments. As shown in these embodiments, under certain conditions, an optical head may be configurated such that the beam splitter 4 is turned so that the light incident face and the face having the reflection beam-dividing elements 7A or 7B or 13 or 18 are interchanged, as shown in FIG. 21 and FIG. 22. Such optical head has reduced vertical size from the optical disk 6 to the beam splitter 4.

In the above-mentioned first through fourteenth embodiments, the objective lens and collimation lens are referred to for the convenience of description, but these are the same as the lenses generally used for optical systems.

This invention is applicable not only to the optical head for optical disk, but also to any other optical recording or reproducing apparatus.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An optical head comprising:
   a light source for emitting a source light beam, propagating along a first optical path;
   a beam splitter means, disposed along said first optical path, for splitting said source light beam so that a first beam travels along said first optical path and a second beam travels along a second optical path;
   a focusing means, disposed along said first optical path, for receiving said first light beam from said beam splitter means and focusing said first beam so as to form a focused spot;
a optical recording element disposed along said first optical path for receiving said first light beam from said focusing means;
an optical reflecting means, disposed on said second optical path, for receiving said second light beam from said beam splitter and reflecting said second light beam;
a photo-detector means disposed along said second optical path so as to receive said second light beam reflecting from said optical reflecting means, said optical reflecting means and photo-detector means being arranged so that when said focused spot is a first distance from said optical recording medium said photo-detector issues a first signal, when said focused spot is a second distance from said optical recording medium said photo-detector issues a second signal, said second distance being less than said first distance, and when said focused spot is on said recording medium said photo-detector issues a third signal.

2. An optical head in accordance with claim 1 wherein
said optical reflecting means is an astigmatic optical element, for introducing astigmatism into said second light beam; and
said photo-detector means has at least two divided detector elements.

3. An optical head in accordance with claim 2 wherein
said photo-detector has four divided detector elements.

4. An optical head in accordance with claim 2 wherein
said astigmatic optical element is a reflection elliptical Fresnel lens.

5. An optical head in accordance with claim 2 wherein
said astigmatic optical element is an astigmatic reflection Fresnel lens of off-axis type.

6. An optical head in accordance with claim 1 wherein said optical reflecting means comprises a beam-dividing element for dividing said second light beam into at least two light beams, which travel in said beam splitter toward said photo-detector, and
said photo-detector means has at least a pair of photo-detectors, each pair comprising at least two divided parts.

7. An optical head in accordance with claim 6 wherein
said beam dividing element is reflection circular or elliptical Fresnel lens, or reflection cylindrical lens, or reflection cylindrical grating, or reflection convergence grating.

8. An optical head in accordance with claim 6 wherein
said beam-dividing element consists of reflection prisms.

9. An optical head as in claim 6 wherein said beam dividing element is a circular reflection Fresnel lens.

10. An optical head as in claim 6 wherein said beam dividing element is an elliptical reflection Fresnel lens.

11. An optical head as in claim 6 wherein said beam dividing element is a cylindrical lens.

12. An optical head as in claim 6 wherein said beam dividing element is a reflection cylindrical grating.

13. An optical head as in claim 6 wherein said beam dividing element is a reflection convergence grating.

14. An optical head in accordance with claim 13 wherein
said reflection Fresnel lens is an off axis type Fresnel lens.

15. An optical head in accordance with claim 13 wherein
said grating has uniform period.

16. An optical head in accordance with claim 13 wherein
said grating has symmetric relief profile.

17. An optical head in accordance with claim 1 wherein
said optical reflecting means is a diffraction element which diffracts incident light.

18. An optical head in accordance with claim 17 wherein
said diffraction element consists of gratings having a sawtooth relief profile.

19. An optical head in accordance with claim 1 wherein
a collimation lens is provided between said light source and said beam splitter and
said optical reflecting means includes focusing means.

20. An optical head in accordance with claim 19 wherein
said collimation lens is a transmission Fresnel lens.

21. An optical head in accordance with claim 19 wherein
said collimation lens is an integral part of said beam splitter.

22. An optical head in accordance with claim 1 wherein said optical reflecting means said optical reflection means being an integral part of said beam splitter.

23. An optical head in accordance with claim 1 wherein
said photo-detector means is an integral part of said beam splitter.

24. An optical head in accordance with claim 1 wherein
said photo-detector is of PIN-type, PN-type or Schottky type amorphous Si amorphous SiGe or amorphous SiSn or amorphous SiGeSn formed on a transparent conductive film.

25. An optical head in accordance with claim 1 wherein
said focusing means is an objective lens and
said beam splitter is a polarizing beam splitter,
a quarter-wave plate is provided between said beam splitter and said objective lens, and
another-wave plate is provided between said beam splitter and said optical reflecting means.

26. An optical head in accordance with claim 25 wherein
at least one of said quater-wave plates is an integral part of said beam splitter.

27. An optical head in accordance with claim 25 wherein
said quater-wave plate is an integral part of said optical reflecting means.

28. An optical head in accordance with claim 1 wherein
said focusing means is a transmission Fresnel lens.

29. An optical head in accordance with claim 1 wherein said focusing means is an objective lens which is an integral part of said beam splitter.

30. An optical head in accordance with claim 1 wherein
said beam splitter has a beam splitting plane and a non square quadrilateral shaped plane which is perpendicular to said beam splitting plane and is parallel to said first optical path.

31. An optical head in accordance with claim 1 wherein
said optical reflecting means is comprised of a transparent synthetic resin.

32. An optical head in accordance with claim 1 wherein said reflecting means has a Ag
reflection layer.

* * * * *